July 17, 1962  H. WERNER ET AL  3,044,524
REPAIR PATCH
Filed Sept. 11, 1959
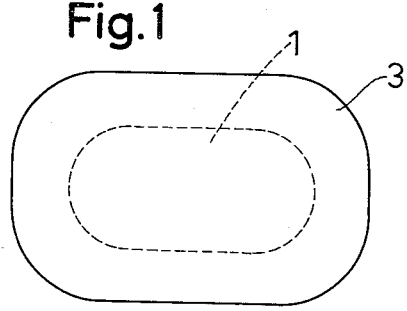
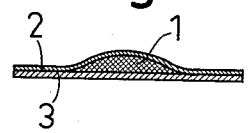
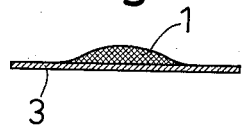
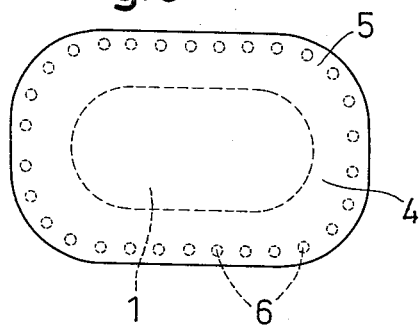
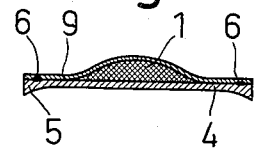
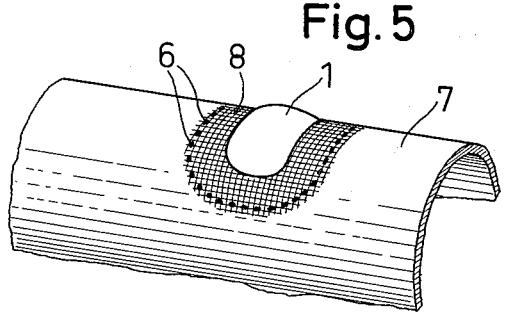
INVENTORS:
Hans Werner
Georg Schmidt-Herzberg
BY

United States Patent Office 3,044,524
Patented July 17, 1962

3,044,524
REPAIR PATCH
Hans Werner, Hannover, Germany, and Georg Schmidt-Hertzberg, Astoria, N.Y., assignors to Continental Gummi-Werke Aktiengesellschaft, Hannover, Germany
Filed Sept. 11, 1959, Ser. No. 839,500
2 Claims. (Cl. 152—367)

The present invention relates to a repair patch for vehicle tubes and other rubber parts. The patch may be provided with an unvulcanized adhesive layer which, if desired, may be connected to a vulcanized layer.

It is an object of the present invention to provide an improved patch which will facilitate the repair of rubber parts.

It is also an object of this invention to provide an improved repair patch which will mark the surface to be roughened around the damaged portion on the vulcanized rubber part.

These and other objects and advantages of the invention will appear more clearly from the following specification in connection with the accompanying drawing in which:

FIG. 1 shows a bottom view of a repair patch according to the invention.

FIG. 2 is a transverse section thhrough the repair patch of FIG. 1.

FIG. 2a is a transverse section through a repair patch with only one cover foil.

FIG. 3 is a bottom view of a modified repair patch according to the invention.

FIG. 4 is a cross section of the repair patch of FIG. 3.

FIG. 5 shows in perspective a section of an inner tube with a repair patch of the invention thereon.

In conformity with the present invention, the patch is so designed that in addition to the patch itself it comprises a cover foil the area of which is greater than the area of the repair patch while the marginal portions of said cover foil protrude beyond the patch on all sides. Preferably, the patch is arranged centrally on the cover foil.

Those portions protruding or extending beyond the patch may have a width of about ½" or more, for instance 1", so that the surface to be roughened will extend sufficiently far beyond the surface area of the patch body in order that a safe connection of the outer edges of the patch body be secured with the rubber part. Thus, for instance, a patch body of 2½" diameter may be provided with a cover foil which protrudes there beyond by at least from ½ to ¾". With a patch having a diameter of 4", a cover foil may be selected the protruding marginal portion of which has a width of approximately ¾ to 1". Patches having a diameter of 1¾" may be equipped with a cover foil protruding by about ½ to ¾".

After the damaged portion has been ascertained, the repair patch according to the invention is placed upon the hole, whereupon the contour of the cover foil is marked by markings along the edge of the repair patch. To this end, a lead pencil mark or a color pencil mark may be made around the edge of the cover foil. It is also possible by a special design of the patch edge, for instance by a color pattern at the edge of the cover foil, to convey the pattern to the rubber part. Within the thus marked limits, roughening of the rubber part will be carried out and subsequently thereto after an adhesive has been placed on the patch body side freed from the cover foil, the patch body having a smaller diameter than the roughened area will be placed upon the processed damaged portion.

The outer marginal portion of the cover foil of the patch also serves as templet for marking the area to be roughened on the rubber portion to be repaired. To this end, it is advantageous to give the cover foil a certain stiffness along its marginal area for preventing any deformation. This may be realized by giving the marginal area of the cover foil an increased thickness. Another possibility consists in making the cover foil over its entire area thicker and thereby giving it an increased stiffness over heretofore known and customary cover foils. This last mentioned step is preferable because cover foils with a continuous uniform thickness can be punched out of a larger sheet. Whereas the heretofore known cover foils generally have a thickness of approximately ⅒ of a millimeter, cover foils adapted to be used as templets may have a thickness of approximately 0.3 millimeters. In this connection, it is to be kept in mind that the thickness of the foil, when employing a metallic cover foil may be less than the thickness of foils made of synthetic material or on a cellulose basis. A foil of greater thickness need be arranged on one side of the patch only, whereas the other side of the patch has no cover foil or merely a cover foil as heretofore customary.

Structural Arrangement

Referring now to the drawing in detail and FIG. 1 in particular, this figure shows a patch 1 the area of which is less than the area of the cover foil 3. In the particular instance shown in FIG. 1, the area of the cover foil 3 amounts to more than twice the area of the patch. As will be seen from FIG. 2 showing a transverse section of FIG. 1, foil 3 mounted on the adhesive side of patch 1 has a thickness which is greater than the thickness of the cover foil 2 so that, when passing a nail or fingernail around the patch, the latter will offer a sufficient resistance against deformation. The cover foil 2 may be smaller than the cover foil 3. FIG. 2 clearly indicates that the outer marginal portion of the cover foil 3 does not gradually become thinner but retains a certain thickness. The cover foils 2 and 3 may also be of square shape.

FIG. 3 shows a modification of the patch according to FIGS. 1 and 2. With the modification of FIG. 3, the cover foil 4 has its marginal area 5 provided with a colored pattern 6 which colored ingredients can easily be conveyed to the rubber part to be repaired by pressing said colored parts against the part to be repaired. Moreover, the cover foil 4 has its marginal area 5 increased in thickness as is clearly shown in FIG. 4 so that said marginal area 5 will offer an increased resistance against deformation.

The pattern 6 may be of any desired design for instance may consist of dots or stripes which will mark the circumference of the cover foil on the rubber part to be repaired. In order to prevent any difficulties when applying the thus designed repair patch, for instance by soiled hands or by rubbing off some of the color, it is advantageous to arrange the colored pattern on that side of the cover foil which faces the patch thereby protecting said side against the second cover foil 9. Inasmuch as the cover foil 9 usually is mounted on the side of the vulcanized layer of the patch, no difficulties will be encountered when removing the cover foil on this side prior to the marking of the area to be roughened on the rubber article to be repaired.

The transferable colored pattern 6 is carried by the foil 4 if the patch is self-adhesive, and the cover foil 9 is preferably removed first. Then the patch is pressed with the inner side of the foil 4 upon the tire to mark the limits of the repair area. Thereupon, the patch and foil are removed. The marked area will then be roughened and the patch is finally fixed thereupon.

The colored pattern 6 is carried by the foil 9 if the patch is not self-adhesive, and the foil 4 is removed first. For marking the tire, the patch is pressed thereupon in the described manner but with foil 9. After the removal of the patch, the area 8 is roughened and, if desired, treated with an adhesive solution and finally the patch is fixed.

FIG. 5 illustrated the arrangement of a patch 1 on a tube 7 which has been provided with a marking along the marginal area of the cover foil, said marking 6 having been transferred from the cover foil to tube 7. On tube 7 there will also be seen the area 8 which was roughened prior to the application of the repair patch. It will also be evident from FIG. 5 that the area of the patch merely amounts to a fraction of the area of the roughened marked surface. The repair patches according to the invention are suitable not merely for repairing tires or tubes but may also be employed for repairing conveyor belts or other similar articles.

It is, of course, to be understood that the present invention is, by no means, limited to the particular embodiments shown in the drawing but also comprises any modifications within the scope of the appended claims.

What we claim is:

1. A repair patch for vehicle inner tubes and other rubber parts, which includes: a patch body, and at least one cover foil mounted on said patch body on the side that is to engage the rubber part to be repaired and having an area greater than the surface area of said patch body and having its marginal portions protruding beyond all of the marginal portions of said patch body, the outermost areas of the marginal portions of said cover foil on the side toward the patch body being provided with pressure transferable color material adapted to be transferred to the rubber part to be repaired when said cover foil is pressed against the rubber part to be repaired.

2. A repair patch for vehicle inner tubes and other rubber parts, which includes: a patch body having an adhesive side, a first cover foil mounted on said adhesive side and having an area greater than the surface area of said patch body and having its marginal portions protruding beyond all of the marginal portions of said patch body, the outermost marginal areas of said first cover foil being provided with pressure transferable colored ingredients along the margin on the side toward the patch body, and a second cover foil covering the other side of said patch body and extending over said first cover foil so as normally to cover those marginal portions thereof which are provided with said transferable colored ingredients whereby the region of a rubber-like body to be prepared to receive the patch body can be ascertained by removing the second cover foil, centering the patch body over the defect to be prepared, and pressing on the first cover foil to transfer colored ingredients to the rubber-like body.

References Cited in the file of this patent
UNITED STATES PATENTS

| | | |
|---|---|---|
| 1,826,073 | Hawkinson | Oct. 6, 1931 |
| 2,486,669 | Nassimbene | Nov. 1, 1949 |
| 2,638,955 | Gruber | May 19, 1953 |
| 2,660,679 | Hunt | Nov. 24, 1953 |
| 2,855,014 | Gruber | Oct. 7, 1958 |